(12) United States Patent
Nakano et al.

(10) Patent No.: US 8,153,239 B2
(45) Date of Patent: Apr. 10, 2012

(54) POLYCARBONATE RESIN COMPOSITION AND HEAT RAY SHIELDING MOLDED PRODUCT

(75) Inventors: Hiroshi Nakano, Hiratsuka (JP); Emi Higashiizumi, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 887 days.

(21) Appl. No.: 11/883,571

(22) PCT Filed: Mar. 13, 2006

(86) PCT No.: PCT/JP2006/304886
§ 371 (c)(1),
(2), (4) Date: Jun. 20, 2008

(87) PCT Pub. No.: WO2006/103906
PCT Pub. Date: Oct. 5, 2006

(65) Prior Publication Data
US 2009/0136730 A1    May 28, 2009

(30) Foreign Application Priority Data
Mar. 28, 2005  (JP) .................................. 2005-090704

(51) Int. Cl.
*B32B 7/02*   (2006.01)
(52) U.S. Cl. ........ 428/212; 428/220; 428/335; 428/336; 428/337
(58) Field of Classification Search .................. 428/212, 428/220, 335, 336, 337
See application file for complete search history.

(56) References Cited

U.S. PATENT DOCUMENTS

| 7,148,313 B2 * | 12/2006 | Koga et al. .................... 528/196 |
| 2004/0028920 A1 | 2/2004 | Fujita et al. |
| 2004/0071957 A1 | 4/2004 | Fujita |
| 2004/0103717 A1 | 6/2004 | Westernacher et al. |
| 2004/0131845 A1 | 7/2004 | Fujita |
| 2006/0127675 A1 | 6/2006 | Nakano et al. |

FOREIGN PATENT DOCUMENTS

| EP | 1 548 064 A1 | 6/2005 |
| JP | 2000-178428 | 6/2000 |
| JP | 2003-105186 | 4/2003 |
| JP | 2005047179 | 2/2005 |
| JP | 2005-179504 | 7/2005 |
| JP | 2005-344006 | 12/2005 |
| JP | 2006249345 | 9/2006 |
| WO | WO 2004/031297 A1 | 4/2004 |

OTHER PUBLICATIONS

Fujita et al (JP 2004-059875 machine translation), Feb. 26, 2004.*
Tokiaki et al (JP 2003-105186 machine translation), Apr. 9, 2003.*
Database WPI Week 200518, Thomson Scientific, London, GB; AN 2005-168569, XP002518678 and JP 2005 047179, Feb. 24, 2005.
Database WPI Week 200437, Thomson Scientific, London, GB; AN 2004-399829, XP002518748 and WO 2004/031297 A, Apr. 15, 2004 and EP 1 548 064 A, Jun. 29, 2005.
Database WPI Week 200667, Thomson Scientific, London GB; AN 2006-641983, XP002518679 and JP 2006 249345 A, Sep. 21, 2006.
International Search Report for PCT/JP2006/304886.
English translation of Office Action in Chinese application serial No. 200680009921.8 received by JP agent Aug. 4, 2011.

* cited by examiner

*Primary Examiner* — Mark Ruthkosky
*Assistant Examiner* — Lawrence Ferguson
(74) *Attorney, Agent, or Firm* — Nixon & Vanderhye P.C.

(57) ABSTRACT

Polycarbonate resin compositions containing 100 parts by weight of aromatic polycarbonate resin having a concentration of end hydroxyl group of 100 to 1800 ppm and 0.0001 to 5 parts by weight of fine particles of a boride of La, Ce, Pr, Nd, Tb, Dy, Ho, Y, Sm, Eu, Re, Tm, Yb, Lu, Sr or Ca. Heat ray shielding molded products molded from this polycarbonate resin composition have low haze, excellent transparency, low solar transmittance and sufficient heat ray shielding properties, especially for visible light and selective shielding for infrared rays, and are excellent in mechanical strength and thermal stability at melting. These molded products may be used for windows for buildings or vehicles or as optical materials such as infrared ray cut filters or films for agricultural use.

8 Claims, No Drawings

POLYCARBONATE RESIN COMPOSITION AND HEAT RAY SHIELDING MOLDED PRODUCT

This application is the U.S. national phase of International Application No. PCT/JP2006/304886 filed 13 Mar. 2006 which designated the U.S. and claims priority to Japanese Patent Application No. 2005-090704, filed 28 Mar. 2005, the entire contents of each of which are hereby incorporated by reference.

TECHNICAL FIELD OF THE INVENTION

The present invention relates to a polycarbonate resin composition and heat ray shielding molded product, and more particularly it relates to a polycarbonate resin composition and heat ray shielding molded product which have low solar transmittance and sufficient heat ray shielding property, have low haze, are excellent in transparency, are excellent in mechanical strength and thermal stability at melting, and are suitably applicable for windows and windows parts of general buildings or vehicles.

BACKGROUND ART OF THE INVENTION

Near infrared rays incidence to the inside room through windows of general buildings or vehicles cause to an increase in the temperature of inside room excessively. In order to prevent this temperature increasing, there is a demand of providing a heat ray shielding resin composition and heat ray shielding molded product which have low solar transmittance and sufficient heat ray shielding, especially have low haze, and excellent in transparency.

To the above demand, there has been known a heat ray shielding material obtained from blending a phthalocyanine compound into a polycarbonate resin, poly(meth)acrylic resin, polyethylene resin, polyester resin, polystyrene resin or vinyl chloride resin (refer to Patent Documents 1 and 2). However, in this heat ray shielding material, in order to provide sufficient heat ray shielding property, a large amount of phthalocyanine compound must be blended thereinto. Therefore, by blending the large amount of phthalocyanine compound, the haze of heat ray shielding material increases and the obtained heat ray shielding material is insufficient in weather resistance.

Further, there has been known a heat ray shielding resin plate comprising a transparent resin plate laminated with a heat ray reflective film deposited with a metal or metal oxide (refer to Patent Documents 3 and 4). However, in this heat ray shielding resin plate, there are problems that the cost of heat ray reflective film is high and complicated lamination steps are required. Therefore, this heat ray shielding resin plate lacks in practical use.

Further, there has been known a heat ray shielding resin molded product comprising a thermoplastic resin selected from the group consisting of polycarbonate-based resins, poly(meth)acrylic acid ester-based resins, saturated polyester resins, cyclic olefin-based resins, polyimide-based resins, polyethersulphone-based resins and fluorine-based resins, and a hexaboride blended thereinto (refer to Patent Document 5). However, this heat ray shielding resin molded product is high in the haze and insufficient in transparency so that the molded product is insufficient in use of windows of general buildings or vehicles.

Patent Document 1: Japanese Patent Application Laid-Open (KOKAI) No. 6-240146
Patent Document 2: Japanese Patent Application Laid-Open (KOKAI) No. 6-264050
Patent Document 3: Japanese Patent Application Laid-Open (KOKAI) No. 10-146919
Patent Document 4: Japanese Patent Application Laid-Open (KOKAI) No. 2001-179887
Patent Document 5: Japanese Patent Application Laid-Open (KOKAI) No. 2004-162020

DISCLOSURE OF THE INVENTION

Problem to be Solved by the Invention

An object of the present invention is to provided a polycarbonate resin composition and heat ray shielding molded product composed thereof, which especially have low haze, are excellent in transparency, have low solar transmittance and sufficient heat ray shielding property (especially, have a function of transparency for visible light and selectively shielding property for infrared ray), are excellent in mechanical strength and thermal stability at melting, and are suitably applicable for windows of general buildings or vehicles.

Means for Solving Problem

As a result of the present inventors' earnest study to solve the above subject, it has been found that by blending a small amount of boride into an aromatic polycarbonate which has a specific end hydroxyl group concentration or which is produced by a specific production method, there can be obtained a polycarbonate resin composition and heat ray shielding molded product composed thereof, which especially have low haze, are excellent in transparency, have low solar transmittance and sufficient heat ray shielding property (especially, have a function of transparency for visible light and selectively shielding property for infrared ray), and are excellent in mechanical strength and thermal stability at melting. The present invention has been attained on the basis of the above finding.

In a first aspect of the present invention, there is provided a polycarbonate resin composition comprising 100 parts by weight of aromatic polycarbonate resin having a concentration of end hydroxyl group of 100 to 1800 ppm and 0.0001 to 5 parts by weight of fine particle of boride of at least one metal selected from the group consisting of La, Ce, Pr, Nd, Tb, Dy, Ho, Y, Sm, Eu, Re, Tm, Yb, Lu, Sr and Ca.

In a second aspect of the present invention, there is provided a heat ray shielding molded product formed by molding the above polycarbonate resin composition, which molded product has a plate-like portion having a thickness of 0.2 to 10 mm, a haze of less than 5% and a solar transmittance of not more than 70%.

Effect of the Invention

The polycarbonate resin composition and heat ray shielding molded product composed thereof according to the present invention, have especially low haze, are excellent in transparency, have low solar transmittance and sufficient heat ray shielding property (especially, have a function of transparency for visible light and selectively shielding property for infrared ray), and are excellent in mechanical strength and thermal stability at melting. Therefore, these are suitably applicable for windows of general buildings or vehicles, roof materials of arcades and carports, optical materials such as infrared ray cut filters, films for agriculture or the like.

PREFERRED EMBODIMENTS FOR CARRYING OUT THE INVENTION

The present invention is explained in detail below.
(1) Aromatic Polycarbonate Resin:

The aromatic polycarbonate resin used in the present invention preferably has a concentration of end OH groups of 100 to 1800 ppm (by weight), preferably 300 to 1500 ppm, especially preferably 400 to 1200 ppm and by using this aromatic polycarbonate resin, a polycarbonate resin composition especially having low haze and excellent in transparency can be obtained. The method of producing the above aromatic polycarbonate resin is not limited and known methods such as interfacial polymerization method, pyridine method, transesterification method or the like can be used, and transesterification method is preferred. The polycarbonate resin used in the composition according to the present invention may be produced by conducting transesterification and polymerization of an aromatic dihydroxy compound and diester of carbonic acid as materials in the presence of transesterification catalyst under melting condition. The aromatic polycarbonate resin used in the present invention is explained in more detail below.

As the aromatic dihydroxy compounds which is one of the material of the aromatic polycarbonate resin used in the present invention, there may be exemplified bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane, 1,1-bis(4-hydroxyphenyl)cyclohexane, 4,4'-dihydroxy-biphenyl, 3,3',5,5'-tetramethyl-4,4'-dihydroxy-biphenyl, bis(4-hydroxyphenyl)sulfone, bis(4-hydroxyphenyl)sulfide, bis(4-hydroxyphenyl)ether, bis(4-hydroxyphenyl)ketone, or the like. These aromatic dihydroxy compounds may be used singly or in the form of the mixture thereof. Further, a polyhydroxy compound having three or more hydroxyl groups in a molecule such as 1,1,1-tris(4-hydroxyphenyl)ethane (THPE) and 1,3,5-tris(4-hydroxyphenyl)benzene are used together with the aromatic dihydroxy compound in a small amount as a branching agent. Among these aromatic dihydroxy compounds, 2,2-bis(4-hydroxyphenyl)propane (namely, bisphenol A, hereinafter occasionally abbreviated as "BPA") is preferred.

As the diester of carbonic acid (carbonic diester) which is one of the other material of the aromatic polycarbonate resin used in the present invention, there may be exemplified diarylcarbonates such as diphenyl carbonate and ditolyl carbonate, dialkyl carbonate such as dimethyl carbonate, diethyl carbonate and di-t-butyl carbonate or the like. These carbonic diesters may be used in combination of any two or more thereof. Among these carbonic diesters, preferred are diphenyl carbonate (hereinafter occasionally abbreviated as "DPC") and substituted diphenyl carbonates.

Further, the above carbonic diesters may be substituted with a dicarboxylic acid or a dicarboxylic acid ester in an amount of preferably not more than 50 mol %, more preferably not more than 30 mol %. As typical examples of the dicarboxylic acid or dicarboxylic acid ester, there are exemplified terephthalic acid, isophthalic acid, diphenyl terephthalate, diphenyl isophthalate or the like. In case of substituting with such dicarboxylic acid or dicarboxylic acid ester, a polyester carbonate can be obtained.

The aromatic polycarbonate resin used in the present invention preferably has a concentration of end OH groups of 100 to 1800 ppm (by weight), preferably 300 to 1500 ppm, especially preferably 400 to 1200 ppm and by using this aromatic polycarbonate resin. In order to obtain this polycarbonate resin, these carbonic diesters (which include the above substituted dicarboxylic acid or a dicarboxylic acid ester, (the same explanation is given hereinafter)) are usually used in an excess amount to the amount of aromatic dihydroxy compound. Namely, they are used in an amount of 1.001 to 1.3 mol, preferably 1.01 to 1.2 based on the mole of aromatic dihydroxy compound. When the molar ratio of carbonic diesters is less than 1.001 mol, the amount of end OH groups in the produced aromatic polycarbonate resin increases so that especially in case where the concentration of end OH groups exceeds 1800 ppm, thermal stability and hydrolysis resistance thereof are deteriorated. When the molar ratio of carbonic diesters is more than 1.3 mol, although the amount of end OH groups reduces, the transesterification rate under the same condition is reduced so that it may be difficult to produce a polycarbonate resin or oligomer having the intended molecular weight. Further, in case where the amount of end OH groups is less than 100 ppm, the haze of polycarbonate-resin composition may be high and the transparency thereof may be deteriorated. Incidentally, the unit of concentration of end OH groups is the weight of end OH groups based on the weight of polycarbonate resin represented as ppm. The method for the measurement of end OH groups is not specifically limited and a method of titanium tetrachloride/acetic acid method described in Macromol. Chem. 88 215 (1965) is generally used.

The reason why the aromatic polycarbonate resin obtained by transesterification method has such good haze is unknown, but the following reason is presumed. Namely, a heterogeneous backbone structure (branched constitutional units) generated accompanied with transesterification has functional groups such as an OH group and COOH group, and these functional groups act as the similar action of the end hydroxyl group. In the present invention, the amount of heterogeneous backbone structure is expressed by a percentage (mol %) of total amount (mol) of heterogeneous structure unit represented by the following formula (2) and (3) to the amount (mol) of normal structure (hereinafter abbreviated as "heterogeneous structure amount"). The heterogeneous structure amount of aromatic polycarbonate resin obtained by transesterification method is usually 0.01 to 1 mol %, preferably 0.1 to 0.5 mol %. When the heterogeneous structure amount is too small, the improvement effect of haze may be insufficient and when the heterogeneous structure amount is too large, there may be problems of gelation by crosslinking and deterioration of hue. Therefore, these are not preferable.

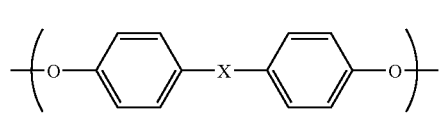 (1)

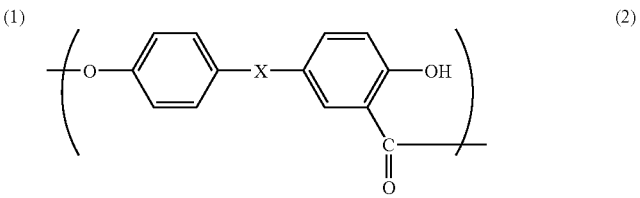 (2)

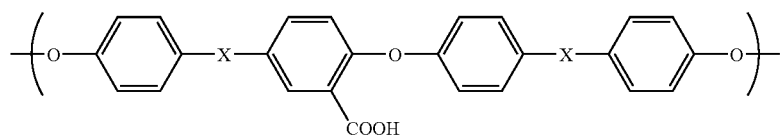 (3)

In the above formulas, X is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or a divalent connecting group selected from the group consisting of —O—, —S—, —CO—, —SO— and —SO$_2$—.

The above heterogeneous structure amount can be readily determined for example by a method comprising dissolving the aromatic polycarbonate resin into methylene chloride to prepare a solution, adding sodium methoxide methanol solution and pure water into the solution to prepare a mixture solution, conducting alkali hydrolysis at the room temperature and analysis of each heterogeneous structure by liquid chromatograph method using a UV detector for the detective wave length of 280 nm. The quantitative determination of each heterogeneous structure is determined by use of absorption constant. As a facile method, a method by calculating from the peak area percentage of each heterogeneous backbone structure based on the peak area of bisphenol A.

Upon producing the aromatic polycarbonate resin by conducting the transesterification of aromatic dihydroxy compound and carbonic diester at the melting condition, a transesterification catalyst may be usually used therein. The kind of transesterification catalyst usable in the process for producing the aromatic polycarbonate resin according to the present invention is not particularly limited. Examples of the generally used catalyst may include basic compounds such as alkali metal compounds, alkali earth metal compounds, basic boron compounds, basic phosphorus compounds, basic ammonium compounds and amine-based compounds. These basic compounds may be used singly or in the combination of any two or more thereof. The amount of catalyst used is usually 0.05 to 200 μmol, preferably 0.08 to 10 μmol, more preferably 0.1 to 2 μmol. When the amount of catalyst used is too small, polymerization activity for producing the aromatic polycarbonate resin having desired molecular weight may not be obtained. When the amount of catalyst used is too large, the hue of polymer is deteriorated.

The above transesterification catalyst is preferably used in a form of catalyst solution where the catalyst is dissolved into a solvent. As the solvent, there are exemplified water, acetone, alcohols, toluene and phenol as well as solvents capable of dissolving the materials aromatic dihydroxy compound and carbonic diester. Of these, water is preferred. Especially, in case of using an alkaline metal compound as the catalyst, water is preferably used as aqueous solution.

The method for producing the aromatic polycarbonate resin used in the present invention is not specifically limited within using transesterification method and various known methods for example the following method can be used. Namely, usually, an aromatic dihydroxy compound and a carbonic diester are mixed with stirring thereof uniformly in a material mixing tank, a catalyst is added thereinto, and polymerization is conducted to produce an aromatic polycarbonate resin. The type of reaction may be any of batch type, continuous type and batch and continuous type in combination.

The polymerization reaction (transesterification reaction) for producing the polycarbonate in the present invention is preferably continuously conducted by generally using two or more polymerization vessels, i.e., by usually two or more stage process, preferably 3 to 7 multi-stage process. Typical reaction conditions include a reaction temperature of 150 to 3200° C.; a reaction pressure of from ordinary pressure to 2.0 Pa; and an average residence time of 5 to 150 min. In the respective polymerization vessels, in order to allow the reaction to proceed more smoothly and discharge by-produced phenol more effectively, the reaction conditions thereof may be controlled such that the temperature and vacuum degree are sequentially stepwise increased within the above-specified ranges. Incidentally, in order to prevent deterioration of product qualities of obtained aromatic polycarbonate resin such as hue, the reaction conditions are preferably controlled as low temperature as possible and/or short residence time as possible.

The type of an apparatus used in the above transesterification reaction may be any of vertical type, horizontal type, pipe type or tower type. There may be usually used one or more vertical-type polymerization vessels equipped with turbine blades, paddle blades, anchor blades, full zone blades (manufactured by Shinko Pantec Co., Ltd.), Sunmeler blades (manufactured by Mitsubishi Heavy Industries, Ltd.), Max-blend blades (manufactured by Sumitomo Heavy Industries, Ltd.), helical ribbon blades and twisted grid blades (manufactured by Hitachi Ltd.) which are followed by a horizontal single-screw type polymerization vessel of a disk type or a cage type, or a horizontal twin-screw type polymerization vessel equipped with HVR, SCR, N-SCR (manufactured by Mitsubishi Heavy Industries, Ltd.), Bibolak (manufactured by Sumitomo Heavy Industries, Ltd.), spectacle-shaped blades, grid blades (manufactured by Hitachi Ltd.), or the combination of spectacle-shaped blades and blades having a function of feeding polymers, e.g., turned or twisted blades and/or inclined blades.

The aromatic polycarbonate produced by the above transesterification method usually contains residual components such as raw monomers, catalyst, and low-molecular weight compounds such as aromatic hydroxy compounds by-produced by the transesterification reaction. Among these residual components, the raw monomers and aromatic hydroxy compounds are present in a large amount, and adversely affect qualities of the polycarbonate such as heat-aging resistance and hydrolysis resistance. Therefore, the raw monomers and aromatic hydroxy compounds are preferably removed upon production of the polycarbonate. As the residual amount of raw monomers in the polycarbonate, in case of aromatic dihydroxy compounds, the amount is usually not more than 150 ppm by weight, preferably not more than 100 ppm by weight, more preferably not more than 50 ppm by weight, in case of aromatic monohydroxy compounds, the amount is usually not more than 100 ppm by weight. Further, the residual amount of carbonic diester is usually not more than 300 ppm by weight, preferably not more than 200 ppm by weight, more preferably not more than 150 ppm by weight.

The method of removing the above residual low-molecular weight compounds is not particularly restricted. For example, these residual components may be continuously removed by volatilization using a vent-type extruder. At this time, the basic transesterification catalyst still remaining in the resin may be deactivated by previously adding thereto acidic compounds or precursors thereof in order to prevent occurrence of undesired side reactions during the volatilization procedure and effectively remove the raw monomers and aromatic hydroxy compounds.

The acidic compounds or precursors thereof added to the catalyst are not particularly restricted, and there may be used any substances capable of effectively neutralizing the basic transesterification catalyst used in the polycondensation reaction. Specific examples of the acidic compounds or precursors thereof may include Brϕnsted acids such as hydrochloric acid, nitric acid, boric acid, sulfuric acid, sulfurous acid, phosphoric acid, phosphorous acid, phosphonic acid, polyphosphoric acid, adipic acid, ascorbic acid, aspartic acid, azelaic acid, adenosine phosphoric acid, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid and maleic acid, as well as esters of these acids. These acidic compounds or precursors thereof may be used singly or in the combination of any two or more thereof. Of these acidic compounds or precursors thereof, preferred are sulfonic acid compounds or esters thereof, for example, p-toluenesulfonic acid, methyl p-toluenesulfonate and butyl p-toluenesulfonate.

The amount of the acidic compounds or precursors thereof added is 0.1 to 50 times by mol and preferably 0.5 to 30 times by mol based on the amount thereof necessary to neutralize the basic transesterification catalyst used in the polycondensation reaction. The acidic compounds or precursors thereof may be added to the reaction system at any time after the polycondensation reaction. Also, the method of adding these acidic compounds or precursors thereof is not particularly restricted, and any methods may be used depending upon properties of these compounds used and desired conditions, for example, there may be used the method of directly adding these compounds to the reaction system, the method of dissolving these compounds in a suitable solvent and then adding the resultant solution to the reaction system, the method using pellets or flake-like master batch of these compounds, etc.

The extruder used for the volatilization may be any of a single-screw type or a twin-screw type. In addition, the twin-screw type extruder may be a geared twin-screw extruder whose screws may be rotated in the same direction or opposite directions. For the purpose of the volatilization, the extruder is preferably provided with a vent portion disposed downstream of the portion where the acidic compounds or precursors thereof are added. The number of vents provided in the extruder is not particularly restricted, and there may be usually used 2 to 10 multi-stage vents. If required, various additives such as stabilizers, ultraviolet absorbers, mold release agents and colorants may be added to the extruder, and mixed and kneaded with the resin therein.

The aromatic polycarbonate resin used in the present invention has a viscosity-average molecular weight of usually 12,000 to 50,000, preferably 15,000 to 40,000, more preferably 17,000 to 32,000 calculated from the solution viscosity measured at 25° C. in terms of a solution viscosity using methylene chloride as a solvent. When the viscosity-average molecular weight is less than 12,000, the mechanical strength thereof may be poor and when the viscosity-average molecular weight is more than 50,000, moldability thereof may be deteriorated.

(2) Fine Particle of Boride:

The fine particle of boride used in the present invention is a fine particle of boride of at least one metal selected from the group consisting of La, Ce, Pr, Nd, Tb, Dy, Ho, Y, Sm, Eu, Re, Tm, Yb, Lu, Sr and Ca. As the boride, a hexaboride is preferred. The surface of boride fine particle is preferably not oxidized but there can be used somewhat surface oxidized particle with no effect for the heat ray shielding property. The above boride fine particle is a colored fine particle of gray-black color, brown-black color, green-black color or the like. However, by dispersing the boride fine particle having a particle size sufficiently smaller than the visible wavelengths and heat ray shielding property into a molded product, the molded product having heat ray shielding property has transparency of visible light while maintaining sufficient heat ray shielding property. Therefore, the particle size of boride fine particle is usually not more than 1000 nm, preferably not more than 200 nm. When the particle size of boride fine particle or coarse particle formed by coagulating of fine particles is more than 1000 nm, the haze of resin molded product is increase, the transparency is deteriorated and this is not preferable.

In the present invention, there may be used a boride fine particle whose surface is coated with a silane compound, titanium compound, zirconium compound, or the like. By coating the surface of fine particle with these compounds, the water resistance of boride fine particle can be improved.

In the present invention, in order to improve the uniform dispersibility and workability of boride fine particles, it is preferred to disperse the boride fine particles into a polymer dispersant. As the above polymer, there are preferably used one which has high transparency and high visible light transmittance. As concrete example thereof, there may be mentioned polyacrylate-based dispersants, polyurethane-based dispersants, polyether-based dispersants, polyester-based dispersants, polyester-urethane-based dispersants, or the like. Of these, polyacrylate-based dispersants, polyether-based dispersants and polyester-based dispersants are preferred. The blending amount of polymer dispersant to the boride fine particle is usually not less than 0.3 parts to less than 50 parts by weight, preferably 1 to 50 parts by weight based on 1 part by weight of boride fine particle.

As the method of dispersing the boride fine particles into the polymer dispersant, there may be exemplified a method comprising mixing the boride fine particles, organic solvent and polymer dispersant in proper amounts respectively to prepare a mixture, bead-mill-mixing the mixture by using zirconium beads having a diameter of 0.3 mm for 5 hours to prepare a dispersion liquid of boride fine particles (concentration of bride fine particles: 65% by weight), adding further polymer dispersant in a proper amount into the dispersion liquid, and removing the organic solvent at 60° C. under reduced pressure with stirring to obtain a dispersed mixture of boride fine particles.

The blending amount of aromatic polycarbonate resin and boride fine particle is such a ratio that the amount of boride fine particle is 0.0001 to 5 parts by weight, preferably 0.0005 to 1 parts by weight, more preferably 0.001 to 0.1 parts by weight based on 100 parts by weight of aromatic polycarbonate resin. When the amount of boride fin particle is less than 0.0001 parts by weight, the effect of heat ray shielding property may be too small and when the amount is more than 5 parts by weight, the haze and cost may become high, then these are not preferable.

Further, at the molding of polycarbonate resin composition or at the use of resin composition for window or window parts applications, in order to improve the stability of hue, weather resistant improvers, heat stabilizers, antioxidants, mold release agents dyes and pigments may be blended into the polycarbonate resin composition according to the present invention.

Weather Resistant Improvers:

As the weather resistant improvers, there are exemplified inorganic ultraviolet absorbers such as titanium oxide, cerium oxide and zinc oxide as well as organic ultraviolet absorbers such as benzotriazole compounds, benzophenone compounds and triazine compounds. Of these ultraviolet absorbers, preferred are organic ultraviolet absorbers, and more preferred is benzotriazole compounds, 2-(4,6-diphenyl-1,3,5-triazin-2-yl)-5-[(hexyl(oxy))-phenol, 2-[4,6-bis(2,4-dimethylphenyl)-1,3,5-triazin-2-yl]-5-(octyloxy)phenol, 2,2'-(1, 4-phenylene)bis[4H-3,1-benzoxazin-4-one], [(4-methoxyphenyl)-methylene]propanedioic acid dimethyl ester, or the like.

As the benzotriazole compounds, there are exemplified 2-(2'-hydroxy-5'-methylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-5'-t-octylphenyl)-2H-benzotriazole, 2-(2'-hydroxy-5'-t-butylphenyl)benzotriazole, 2-(2'-hydroxy-5'-methacryloxyphenyl)-2H-benzotriazole, 2-(2'-hydroxy-3',5'-di-t-amylphenyl)benzotriazole, 2-[2'-hydroxy-3',5'-bis(α,α-dimethylbenzyl)phenyl]-2H-benzotriazole, 2-[2'-hydroxy-3'-(3",4",5",6"-tetrahydrophthalimidemethyl)-5'-methylphenyl]benzotriazole, 2,2'-methylene-bis[4-(1,1,3,3-tetramethylbutyl)-6-(2H-benzotriazole-2-yl)phenol, condensates of (methyl-3-[3-t-butyl-5-(2H-benzotriazol-2-yl)-4-hydroxyphenyl]propionate and polyethylene glycol), or the like.

Of these weather resistant improvers, especially preferred are 2-(2'-hydroxy-5'-t-octylphenyl)-2H-benzotriazole, 2-[2'-hydroxy-3',5'-bis(α,α-dimethylbenzyl)phenyl]-2H-benzotriazole, 2-(4,6-diphenyl-1,3,5-triazin-2-yl)-5-[(hexyl)oxy]-phenol, 2-[4,6-bis(2,4-dimethylphenyl)-1,3,5-triazin-2-yl]-5-(octyloxy)phenol and 2,2'-methylenebis-[4-(1,1,3,3-tetramethylbutyl)-6-(2H-benzotriazol-2-yl)phenol].

The amount of the weather resistant improver blended is 0.01 to 5 parts by weight based on 100 parts by weight of the aromatic polycarbonate resin. When the amount of the weather resistant improver blended is more than 5 parts by weight, there tend to arise problems such as mold deposit upon molding. When the amount of the weather resistant improver blended is less than 0.01 parts by weight, the effect of weather resistant improvement may be insufficient. The weather resistant improver may be used singly or in the combination of any two or more thereof.

Heat Stabilizers:

As the heat stabilizer, at least one selected from phosphorous ester compounds esterified with phenol and/or phenol having at least one alkyl group having 1 to 25 carbon atoms, phosphorous acid and tetrakis(2,4-di-t-butylphenyl)-4,4'-biphenylene-diphosphonite are preferred.

Examples of the above phosphorous ester compounds may include trioctylphosphite, tridecylphosphite, trilaurylphosphite, tristearylphosphite, triisooctylphosphite, tris(nonylphenyl)phosphite, tris(2,4-dinonylphenyl)phosphite, tris (2,4-di-t-butylphenyl)phosphite, triphenylphosphite, tris(octylphenyl)phosphite, diphenylisooctylphosphite, diphenylisodecylphosphite, octyldiphenylphosphite, dilaurylphenylphosphite, diisodecylphenylphosphite, bis(nonylphenyl)phenylphosphite, diisooctylphenylphosphite, diisodecylpentaerythritol diphosphite, dilaurylpentaerythritol diphosphite, distearylpentaerythritol diphosphite, (phenyl)(1,3-propanediol) phosphite, (4-methylphenyl)(1,3-propanediol) phosphite, (2,6-dimethylphenyl)(1,3-propanediol) phosphite, (4-t-butylphenyl)(1,3-propanediol) phosphite, (2,4-di-t-butylphenyl)(1,3-propanediol) phosphite, (2,6-di-t-butyl-4-methylphenyl)(1,3-propanediol) phosphite, (phenyl)(1,2-ethanediol) phosphite, (4-methylphenyl)(1,2-ethanediol) phosphite, (2,6-dimethylphenyl)(1,2-ethanediol) phosphite, (4-t-butylphenyl)(1,2-ethanediol) phosphite, (2,4-di-t-butylphenyl)(1,2-ethanediol) phosphite, (2,6-di-t-butylphenyl)(1,2-ethanediol) phosphite, (2,6-di-t-butyl-4-methylphenyl)(1,2-ethanediol) phosphite, (2,6-di-t-butyl-4-methylphenyl)(1,4-buthanediol) phosphite, diphenylpentaerythritol diphosphite, bis(2-methylphenyl) pentaerythritol diphosphite, bis(3-methylphenyl)pentaerythritol diphosphite, bis(4-methylphenyl)pentaerythritol diphosphite, bis(2,4-dimethylphenyl)pentaerythritol diphosphite, bis(2,6-dimethylphenyl)pentaerythritol diphosphite, bis(2,3,6-trimethylphenyl)pentaerythritol diphosphite, bis(2-t-butylphenyl)pentaerythritol diphosphite, bis(3-t-butylphenyl)pentaerythritol diphosphite, bis(4-t-butylphenyl)pentaerythritol diphosphite, bis(2,4-di-t-butylphenyl) pentaerythritol diphosphite, bis(2,6-di-t-butylphenyl) pentaerythritol diphosphite, bis(2,6-di-t-butyl-4-methylphenyl)pentaerythritol diphosphite, bis(2,6-di-t-butyl-4-ethylphenyl)pentaerythritol diphosphite, bis(biphenyl)pentaerythritol diphosphite, dinaphthylpentaerythritol diphosphite, or the like.

The content of the heat stabilizer is usually 0.061 to 1 part by weight, preferably 0.001 to 0.4 parts by weight based on 100 parts by weight of aromatic polycarbonate resin. When the content of the heat stabilizer is more than 1 part by weight, the hydrolysis resistance or the like may be deteriorated.

Antioxidants:

As the antioxidant preferably used in the present invention, there are exemplified hindered phenol-based antioxidants. Specific examples of the hindered phenol-based antioxidants may include pentaerythrityl-tetrakis[3-(3,5-di-t-butyl-4-hydroxyphenyl)propionate], octadecyl-3-(3,5-di-t-butyl-4-hydroxyphenyl)propionate, thio-diethylenebis[3-(3,5-di-t-butyl-4-hydroxyphenyl)propionate], N,N'-hexane-1,6-di-yl-bis [3-(3,5-di-t-butyl-4-hydroxyphenylpropionamide), 2,4-dimethyl-6-(1-methylpentadecyl)phenol, diethyl[[3,5-bis(1,1-dimethylethyl)-4-hydroxyphenyl]methyl]phosphate, 3,3',3",5,5',5'-hexa-t-butyl-a,a',a"-(mesitylene-2,4,6-tri-yl)tri-p-cresol, 4,6-bis(octylthiomethyl)-o-cresol, ethylene-bis (oxyethylene)bis[3-(5-t-butyl-4-hydroxy-m-tolyl) propionate], hexamethylene-bis[3-(3,5-di-t-butyl-4-hydroxyphenyl)propionate], 1,3,5-tris(3,5-di-t-butyl-4-hydroxybenzyl)-1,3,5-trazine-2,4,6(1H,3H,5H)-tri-one, 2,6-di-t-butyl-4-(4,6-bis(octylthio)-1,3,5-triazine-2-yl-amino) phenol, or the like. Of these, pentaerythrityl-tetrakis[3-(3,5-di-t-butyl-4-hydroxyphenyl)propionate] and octadecyl-3-(3,5-di-t-butyl-4-hydroxyphenyl)propionate are especially preferred. These two phenol-based antioxidants are available as trade names of "IRGANOX 1010" and "IRGANOX 1076", respectively produced by Ciba Specialty Chemicals Corp.

The amount of phenol-based antioxidant blended is usually 0.01 to 1 part by weight based on 100 parts by weight of aromatic polycarbonate resin. When the content of the phenol-based antioxidant is less than 0.1 parts by weight, the effect of antioxidant may not be insufficient and when the content of the phenol-based antioxidant is more than 1 part by weight, the effect of antioxidant may be saturated.

Mold Release Agents:

Examples of preferred mold release agents used in the present invention may include at least one selected from aliphatic carboxylic acids, esters of aliphatic carboxylic acid and aliphatic alcohol, aliphatic hydrocarbon compounds having a number-average molecular weight of 200 to 15000 and polysiloxane-based silicone oils.

Examples of the above aliphatic carboxylic acids may include saturated or unsaturated aliphatic monocarboxylic acids, dicarboxylic acids and tricarboxylic acids. Here, the aliphatic carboxylic acids also involve alicyclic carboxylic acids. Of these aliphatic carboxylic acids, preferred are $C_6$ to $C_{36}$ mono- or di-carboxylic acids, and more preferred are $C_6$ to $C_{36}$ aliphatic saturated monocarboxylic acids. Specific examples of such aliphatic carboxylic acids may include palmitic acid, stearic acid, caproic acid, capric acid, lauric acid, arachic acid, behenic acid, lignoceric acid, cerotic acid, melissic acid, tetrariacontanoic acid, montanic acid, adipic acid and azelaic acid.

As the aliphatic carboxylic acid components constituting the ester of aliphatic carboxylic acid and aliphatic alcohol, there may be used the same aliphatic carboxylic acids as described above. Also, as the aliphatic alcohol components constituting the aliphatic carboxylic acid esters, there may be used saturated or unsaturated monohydric alcohols, saturated or unsaturated polyhydric alcohols, etc. These alcohols may have substituent groups such as a fluorine atom, an aryl group or the like. Of these alcohols, preferred are saturated monohydric or polyhydric alcohols having not more than 30 carbon atoms, and more preferred are polyhydric alcohols or aliphatic saturated monohydric alcohols having not more than 30 carbon atoms. Here, the aliphatic alcohols also involve alicyclic alcohols. Specific examples of the alcohols may include octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylol propane and dipentaerythritol. These ester of aliphatic carboxylic acid and aliphatic alcohol may contain aliphatic carboxylic acids and/or alcohols as impurities, or may be in the form of a mixture of a plurality of compounds.

Specific examples of the ester of aliphatic carboxylic acid and aliphatic alcohol may include bees wax (mixtures containing myricyl palmitate as a main component), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate and pentaerythritol tetrastearate or the like.

As the aliphatic hydrocarbon compounds having a number-average molecular weight of 200 to 15000, there are exemplified liquid paraffins, paraffin waxes, microwaxes, polyethylene waxes, Fischer-Tropsch waxes, α-olefin oligomers having $C_3$ to $C_{12}$ or the like. Here, the aliphatic hydrocarbon compounds also involve alicyclic hydrocarbon compounds. Further, these hydrocarbon compounds may be partially oxidized. Of these, paraffin waxes, polyethylene waxes and partially oxidized products of polyethylene wax are preferred, and paraffin waxes and polyethylene waxes are more preferred. The number-average molecular weight of aliphatic hydrocarbon compounds is preferably 200 to 5000. These aliphatic hydrocarbon compounds may be used singly or as a mixture of two or more compounds having various components and molecular weights as long as the main constitution has the properties within the above range.

As the polysiloxane-based silicone oils, there are exemplified dimethyl silicone oils, phenylmethyl silicone oils, diphenyl silicone oils, fluorinated alkyl silicone oils or the like. These may be used singly or as a mixture of two or more.

The amount of mold release agent blended is usually 0.01 to 1 part by weight based on 100 parts by weight of aromatic polycarbonate resin. When the content of the mold release agent is more than 1 part by weight, there may be problems of deterioration of hydrolysis resistance and contamination of mold at the molding stage. These mold release agents may be used singly or as a mixture of two or more.

Dyes or Pigments:

As the dyes or pigments used in the present invention, there are exemplified organic pigments, inorganic pigments, organic dyes or the like. As the inorganic pigments, there are exemplified carbon black, sulfide-based pigments such as cadmium red and cadmium yellow, silicate-based pigments such as Prussian blue, oxide-based pigments such as titanium oxide, zinc oxide (Chinese white), iron oxide red, chromium oxide, iron black, titanium yellow, zinc-iron based brown, titanium-cobalt based green, cobalt green, cobalt blue, copper-chromium based black and copper-iron based black, chromium-based pigments such as chrome yellow and molybdate orange, ferrocyanide-based pigments such as iron blue, or the like. As the organic pigments and organic dyes, there are exemplified phthalocyanine-based dyes and pigments such as copper phthalocyanine blue and copper phthalocyanine green, condensed polycyclic dyes and pigments such as azo-based (for example nickel azo yellow), thioindigo-based, perynone-based, perylene-based, quinacridone-based, dioxazine-based, isoindolinone-based and quinophthalone-based dyes and pigments, anthraquinone-based, heterocyclic ring-based and methyl-based dyes and pigments, or the like. Of these, titanium oxide, carbon black, cyanine-based compounds, quinoline-based compounds, anthraquinone-based compounds, phthalocyanine-based compounds are preferred and carbon black, anthraquinone-based compounds, phthalocyanine-based compounds in view of thermal stability. As concrete examples of these, MACROLEX Blue RR, MACROLEX Violet 3R, MACROLEX Violet B (manufactured by Bayer AG), Sumiplast Violet RR, Sumiplast Violet B, Sumiplast Blue OR, (manufactured by Sumitomo Chemical Co., Ltd.), Diaresin Violet D, Diaresin Blue G, Diaresin Blue N (manufactured by Mitsubishi Chemical Corporation) or the like.

The amount of dye and pigment blended is usually not more than 1 part by weight, preferably not more than 0.3 part by weight, more preferably not more than 0.1 part by weight based on 100 parts by weight of aromatic polycarbonate resin. These dyes and pigments may be used singly or as a mixture of two or more.

In the present invention, dyes or pigments are blended for the purpose of controlling visibility by transmitted light. Namely, when the blending amount of metal boride fine particle is increased, there may be a tendency that the hue of molded product is changed and the visibility thereof is deteriorated (concretely, L value is reduced, absolute values of "a" and "b" are increased). Thus, by selecting the kind and/or blending amount of dye or pigment so as to obtain a proper hue, the visibility by transmitted light is improved. Of course, case by case of application of molded product, for example, in case of use for a sunroof, the L value may be intentionally reduced by blending a black pigment such as carbon black within a range which does not affect the heat shielding property.

Infrared Absorbers:

In order to further improve the heat shielding property, if necessary, an infrared absorber such as an antimony doped tin oxide particle, zinc oxide particle containing at least one element selected from the group consisting of In, Ga, Al and Sb, tin doped indium oxide particle, other organic or inorganic infrared absorbers such as phthalocyanine-based compositions, naphthalocyanine-based compositions, copper sulfide, copper ion compounds may be blended into the polycarbonate resin composition.

Other Additives:

The polycarbonate resin composition according to the present invention may further contain other additives within adversely affected the effect of the present invention. As the additives, there are exemplified other thermoplastic resins such as ABS, polystyrene, polyethylene, polypropylene and polyesters, flame retardants such as phosphorous-based, metal salt-based and silicone-based flame retardants, impact resistance improvers, anti-static agents, slip agents, anti-blocking agents, lubricants, anti-fog agents, natural oils, synthetic oils, waxes, organic fillers, fibrous reinforcing agents such as glass fibers and carbon fibers, plate-like reinforcing agents such as mica, talc and glass flake, inorganic fillers such as potassium titanate, aluminum borate and wollastonite, or the like.

Production Process of Polycarbonate Resin Composition:

A process for producing the polycarbonate resin composition according to the present invention is not specifically limited. As the method, there are exemplified a method (1) in which the boride and other additives are mixed in the polymerization stage of aromatic polycarbonate resin or at the end of polymerization of aromatic polycarbonate resin, a method (2) in which the boride and other additives are mixed in the kneeding step under melting condition of aromatic polycarbonate resin, a method (3) in which after mixing the boride and other additives into a solid state aromatic polycarbonate resin such as a pellet, the mixture is melted and kneaded by use of an extruder, or the like.

Molded Products Having Heat Ray Shielding Property:

A method for molding a heat ray shielding molded product from the polycarbonate resin composition according to the present invention is not particularly limited and any conventional used molding methods for example injection-molding, injection-blow-molding, injection-compression molding, blow-molding, extrusion molding for films or sheets, profile extrusion molding, thermoforming molding, rotational molding or the like. Further, fluid-assist molding using a gas or water, molding using supercritical or subcritical gas, insert molding of various printing functionalized films or sheets, two-color molding, in mold molding, co-extrusion or lamination with the other resin or a UV absorbing layer, or the like are also usable. In view of flexibility of molded product shape capable of molding, injection-molding and injection-compression molding are preferred. In the injection-molding and injection-compression molding, a hot runner can be used. The shape of molded product is optional and a molded product having an optional shape can be obtained, if necessary, but the molded product preferably has a plate-like portion having a planer shape or curved shape.

The thickness of heat ray shielding molded product according to the present invention is not particularly limited and the heat ray shielding molded product has a plate-like portion whose thickness is 0.2 to 10 mm, preferably 1 to 10 mm, more preferably 3 to 8 mm. Further, the other portions than the plate-like portion preferably have the thickness within the above range. When the thickness of plate-like portion in the heat ray shielding molded product according to the present invention is not more than 0.2 mm, it may be necessary for attaining sufficient heat ray shielding property to blend the boride thereinto in a high concentration so that it may be difficult to attain high transparency. Further, by an annealing treatment of these heat ray shielding molded product, it is possible to bond it to the other parts. The bonding method is not particularly limited and known methods such as bonding by a solvent, vibration bonding and bonding by a laser irradiation.

As described above, the heat ray shielding molded product according to the present invention is a molded product comprising the aromatic polycarbonate resin composition and having a plate-like portion whose thickness is 0.2 to 10 mm. The haze at the plate-like portion in the heat ray shielding molded product is less than 5%, preferably less than 3%, more preferably not more than 2.5% and the solar transmittance thereof is not more than 70%, preferably not more than 60%. The ratio of total light transmittance and solar transmittance (total light transmittance/solar transmittance) is usually not less than 1.1, preferably not less than 1.2, more preferably not less than 1.3. When the ratio of total light transmittance/solar transmittance is large, the heat ray is selectively absorbed in comparison with the absorbing of visible light, and therefore, it is preferred that the said ratio is more large. When the haze is not less than 3%, the transparency is deteriorated and it is not applicable for windows of general buildings or vehicles. When the solar transmittance is more than 70%, the room temperature in the general buildings or vehicles excessively rises, and therefore, it is out of scope of the present invention.

The heat ray shielding molded product according to the present invention may be optionally partially decorated on the functional layer or polycarbonate resin and design ability can be provided thereto by blackout, various marks, characters or the like. As the hue of plate-like portion of heat ray shielding molded product, which is not decorated by these, the L value is preferably 92 to 35, the "a" value is preferably 5 to −15 and the "b" value is preferably 15 to −5. Generally, visible light transmittance is preferred when the L value is larger, and coloring is small when the "a" value and "b" value is closer to zero. When the L value is less than 35, it is darkened and the transparency is deteriorated even though the "a" value and "b" value satisfy 5 to −15 and 15 to −5, respectively. When the "a" value and "b" value are less than −15 and −5, respectively, it has green to blue tinge, when the "a" value and "b" value are more than 5 and 15, respectively, it has red to yellow tinge, even though the L value is 80 or more. Therefore, these are not preferable. Further, when the L value, "a" value" and "b" value are out of the above range, there is a tendency that the thermal stability of hue of polycarbonate resin composition is deteriorated.

Further, in order to provide a function required in window or window parts, it is preferred to provide at least one functionalized layer on one side or both side of the above plate-like portion. As the functionalized layer, a hard coat layer and/or antireflection layer are preferred. A method for laminating at least one functionalized layer mentioned above on one side or both side of the above plate-like portion is not specifically limited and various known methods can be employed.

As a method for forming the above antireflection layer, there are exemplified (A) various vacuum deposition methods such as electron beam heating method, resistance heating method and flash deposition method; (B) plasma deposition method; (C) various sputtering methods such as double-pole sputtering method, direct-current sputtering method, high frequency sputtering method, magnetron sputtering method, ion beam sputtering method and bias sputtering method; (D) various ion plating methods such as DC method, RF method, multi-negative electrode method, activation reaction method, HCD method, electric field deposition method, high frequency ion plating method and reactive ion plating method; (E) CVD method, or the like. Further, the antireflection layer can be also formed by a method comprising dispersing a metal oxide sol having high refractive index such as $ZrO_2$ sol, $TiO_2$ sol, $Sb_2O_5$ sol and $WO_3$ sol into a silicon-based hard coating agent or primer to prepare a coating mixture and coating/thermal curing thereof.

As a method for forming the hard coat layer, there is exemplified a method comprising optionally providing an under coat layer on the substrate, coating a hard coating agent such as epoxy-based, acryl-based, amino-resin-based, polysiloxane-based, colloidal silica-based and organic/inorganic hybrid-based hard coating agents by use of various coating methods such as dip coating method, spin coating method, spray coating method and flow coating method, and curing the coating layer by means of heat or UV ray. One or more hard coat layers may be provided on the polycarbonate substrate. For example, the hard coating agent may be coated on the polycarbonate substrate directly as well as coated on an under coat layer which has been provided on the substrate previously. Further, the surface of hard coat layer may be subjected to an inorganic compound treatment such as $SiO_2$ by plasma polymerization, antifog treatment, antirefrection coating or the like. Further, the hard coat layer may be formed by not only coating the hard coating agent on the surface of molding product but also a method in which a sheet or film having a hard coat layer is placed into the mold and the polycarbonate resin composition is injected thereinto to form a monolithic molded product. Into the hard coat layer, there may be contained various additives for example various UV absorbers such as triazole-based compounds and triazine-based compounds, and various heat ray shielding agents such as metal/metal oxide fine particles-based heat ray shielding agents such as borides, ITO, ATO, ZnO and zinc antimonate, and organic heat ray shielding agents such as copper-based, organic complex-based, phthalocyanine-based, naphthalocyanine-based, diimonium-based, anthraquinone-based, aminium-based, cyanine-based, azo compound-based, quinone-based, polymethine-based and diphenylmethane-based compounds. These additives may be added into any of hard coat layer and/or under coat layer. The thickness of antireflection layer and hard coat layer is 1 to 20 μm, preferably 2 to 10 μm. When the thickness is less than 1 μm, the durability of antireflection layer and hard coat layer is insufficient, when the thickness is more than 20 μm, there tends to generate cracks in the antireflection layer and hard coat layer. As the functionalized surface layer of the molded product having heat ray shielding property according to the present invention, it is preferred to provide the hard coat layer in view of application for window or window parts.

EXAMPLES

The present invention is described in more detail below by way of the examples. However, the examples are only illustrative and therefore the present invention is not limited to these examples. The materials used in each Example and Comparative Example and evaluation methods of obtained compositions and molded products therein are shown in the following.

<Materials>
(1) Polycarbonate Resin:
*PC-1: Polycarbonate resin produced by transesterification method (Viscosity-average molecular weight=21,000, Concentration of end hydroxyl group=1000 ppm, Heterogeneous structure amount=0.30 mol %)
*PC-2: Polycarbonate resin produced by transesterification method (Viscosity-average molecular weight=21,000, Concentration of end hydroxyl group=150 ppm, Heterogeneous structure amount=0.35 mol %)
*PC-3: Polycarbonate resin produced by interfacial method (trade name "Iupiron S-3000" produced by Mitsubishi Engineering-Plastics Corporation, Viscosity-average molecular weight of 21,000, Concentration of end hydroxyl group=150 ppm, Heterogeneous structure amount=0 mol %)
*PC-4: Polycarbonate resin produced by interfacial method (trade name "Novarex 7022pj" produced by Mitsubishi Engineering-Plastics Corporation, Viscosity-average molecular weight of 21,000, Concentration of end hydroxyl group=50 ppm, Heterogeneous structure amount=0 mol %)
(2) Borides: Dispersion of lanthanum hexaboride fine particles (trade name "KHDS-02" produced by Sumitomo Metal Mining Co., Ltd., Content of lanthanum hexaboride fine particles=10.5% by weight, Particle diameter=not more than 150 nm)
(3) Weather resistance improver: 2-(2'-hydroxy-5'-tert-octylphenyl)-2H-benzotriazol (trade name "Seesorb 709" produced by Shipro Kasei Kaisha, Ltd, hereinafter abbreviated as "UV absorber")
(4) Heat stabilizer: Tris(2,4-di-tert-butylphenyl)phosphite (trade name "Adekastab AS2112" produced by Adeka Corporation, hereinafter abbreviated as "phosphorous stabilizer")
(5) Antioxidant: Pentaerythrityl-tetrakis[3-(3,5-di-t-butyl-4-hydroxyphenyl)propionate] (trade name "IRGANOX 1010" produced by Ciba Specialty Chemicals Corp., hereinafter abbreviated as "phenol-based stabilizer")
(6) Mold release agent: Pentaerythritol tetrastearate (trade name "Unistar H476" produced by NOF Corporation)
(7) Dye 1: Macrorex blue RR (produced by Bayer AG)
(8) Dye 2: Diaresin red HS (produced by Mitsubishi Chemical Corporation)
(9) Carbon black: trade name "Carbon Black #1000" produced by Mitsubishi Chemical Corporation (hereinafter abbreviated as "CB")

<Evaluation Methods>
(1) Haze/Total Light Transmittance:
By using a 3 mm thickness planar plate as a test specimen, the haze/total light transmittance were measured by NDH-2000 type haze meter produced by Nippon Denshoku Industries Co., Ltd. According to JIS K-7105.
(2) Solar Transmittance:
By using a 3 mm thickness planar plate as a test specimen, the solar transmittance was measured by using a U-3100PC type spectrophotometer produced by Shimadzu Corp. By use of light transmittance value within the wavelength of 300 to 2500 nm, the solar transmittance was calculated according to JIS R-3106.
(3) L Value, "a" Value and "b" Value:
By using a 3 mm thickness planar plate as a test specimen, the L value, "a" value and "b" value were measured by use of an SE200 type chromatographic color tone meter produced by Nippon Denshoku Industries Co., Ltd. According to a transmitting method.

Examples 1 to 6 and Comparative Examples 1 to 2

Materials and additives were mixed by a composition shown in Table 1 and the mixture was fed into a 40 mm single screw extruder and melt-kneaded at 280° C. to obtain a pellet. After the obtained pellet was dried at 120° C. for 5 hours, a 3 mm thickness planer plate was molded by use of M150AII-SJ type injection molding machine produced by Meiki Seisakusho Co., Ltd., at cylinder temperature of 290° C. and mold temperature 80° C., under molding cycle of 40 seconds. On the surface of thus obtained planer plate, an acryl-based under coat and silicone-based hard coat were coated and UV-cured to obtain a test specimen for the above evaluations (1) to (3) having a 10 μm thickness under coat layer and 5 μm thickness hard coat layer which were formed on the surface. The evaluation results are shown in Tables 1 and 2.

TABLE 1

|  | Example 1 | Example 2 | Example 3 | Example 4 |
|---|---|---|---|---|
| Composition (parts by weight) | | | | |
| PC-1 | 100 | 100 | — | — |
| PC-2 | — | — | 100 | — |
| PC-3 | — | — | — | 100 |
| PC-4 | — | — | — | — |

TABLE 1-continued

|  | Example 1 | Example 2 | Example 3 | Example 4 |
|---|---|---|---|---|
| Boride | 0.03 | 0.05 | 0.05 | 0.05 |
| UV absorber | 0.1 | 0.3 | 0.3 | 0.3 |
| Phosphorous-based stabilizer | 0.01 | 0.03 | 0.03 | 0.03 |
| Phenol-based stabilizer | 0.1 | — | — | — |
| Mold release agent | 0.1 | 0.3 | 0.3 | 0.3 |
| Dye 1 | 0.0015 | — | — | — |
| Dye 2 | 0.001 | — | — | — |
| CB | 0.0001 | — | — | — |
| Evaluation results |  |  |  |  |
| Haze (%) | 0.8 | 1.0 | 2.1 | 2.6 |
| Solar transmittance (%) | 42.5 | 35.1 | 35.5 | 35.9 |
| Ratio of total light transmittance/solar transmittance | 1.25 | 1.77 | 1.75 | 1.73 |
| Hue  L value | 72.7 | 78.6 | 78.5 | 78.5 |
| a value | −4.8 | −8.9 | −8.7 | −8.5 |
| B value | 3.9 | 14.1 | 14.3 | 14.3 |

TABLE 2

|  | Comp. Example 1 | Example 5 | Comp. Example 2 | Example 6 |
|---|---|---|---|---|
| Composition (parts by weight) |  |  |  |  |
| PC-1 | — | 100 | — | 100 |
| PC-2 | — | — | — | — |
| PC-3 | — | — | — | — |
| PC-4 | 100 | — | 100 | — |
| Boride | 0.05 | 0.08 | 0.08 | 0.08 |
| UV absorber | 0.3 | 0.3 | 0.3 | 0.3 |
| Phosphorous-based stabilizer | 0.03 | 0.03 | 0.03 | 0.03 |
| Phenol-based stabilizer | — | — | — | — |
| Mold release agent | 0.3 | 0.3 | 0.3 | 0.3 |
| Dye 1 | — | — | — | 0.002 |
| Dye 2 | — | — | — | 0.001 |
| CB | — | — | — | — |
| Evaluation results |  |  |  |  |
| Haze (%) | 3.7 | 1.9 | 5.5 | 1.9 |
| Solar transmittance (%) | 36.8 | 23.6 | 24.2 | 19.6 |
| Ratio of total light transmittance/solar transmittance | 1.68 | 2.11 | 2.05 | 1.83 |
| Hue  L value | 78.3 | 70.6 | 70.0 | 59.7 |
| a value | −8.4 | −11.5 | −11.1 | −11.0 |
| B value | 14.6 | 18.3 | 19.3 | 10.5 |

As seen from the above Tables 1 and 2, it is clearly understood that comparing with Examples 2 to 4 and Comparative Example 1 and also Example 5 and Comparative Example 2, in case of using same blending amount of boride, the polycarbonate resin having the concentration of end hydroxyl group as defined in the present invention has lower haze and excellent transparency.

Comparing with Examples 2 to 4, it is clearly understood that reduction effect of haze is different by the concentration of end hydroxyl group of polycarbonate resin.

Comparing with Examples 5 and 6, it is clearly understood that the resin composition having slightly larger amount of boride (0.08 parts by weight) is capable of reducing the solar transmittance, and also, the hue especially the remarkable coloring shown in the "b" value is improved by addition of dyes 1 and 2

Although the present invention is described above with respect to embodiments which are considered to be most practical and preferable at the present time, the present invention is not limited to these embodiments, and various changes and modifications will be appropriately made within the scope of claims and a whole of a specification of this application unless departing from the subject matter and concept of the present invention, and it should be construed that the changes and modifications are involved within a technical range of the present invention. The present invention is based on Japanese Patent Application No. 2005-90704 filed on Mar. 28, 2005 and the whole content thereof can be incorporated by reference.

INDUSTRIAL APPLICABILITY

The polycarbonate resin composition and heat ray shielding molded product composed thereof according to the present invention, have especially low haze, are excellent in transparency, have low solar transmittance and sufficient heat ray shielding property (especially, have a function of transparency for visible light and selectively shielding property for infrared ray), and are excellent in mechanical strength and thermal stability at melting. Therefore, these are suitably applicable for windows of general buildings or vehicles, roof materials of arcades and carports, optical materials such as infrared ray cut filters, films for agriculture or the like.

The invention claimed is:

1. A heat ray shielding molded product formed by molding the polycarbonate resin composition as comprising 100 parts by weight of aromatic polycarbonate resin having a concentration of end hydroxyl group of 100 to 1800 ppm and 0.0001 to 5 parts by weight of fine particle of boride of at least one metal selected from the group consisting of La, Ce, Pr, Nd, Tb, Dy, Ho, Y, Sm, Eu, Re, Tm, Yb, Lu, Sr and Ca, which molded product has a plate-like portion having a thickness of 0.2 to 10 mm, a haze of less than 5% and a solar transmittance of not more than 70%.

2. A heat ray shielding molded product according to claim 1, wherein the boride in the composition is a hexaboride.

3. A heat ray shielding molded product according to claim 1, wherein the aromatic polycarbonate resin in the composition is obtained by conducting transesterification and polymerization of an aromatic dihydroxy compound and diester of carbonic acid.

4. A heat ray shielding molded product according to claim 1, wherein the concentration of end hydroxyl group of aromatic polycarbonate resin in the composition is 300 to 1500 ppm.

5. A heat ray shielding molded product according to claim 1, wherein at least one functionalized layer is provided on one surface or both surface of the plate-like portion.

6. A heat ray shielding molded product according to claim 5, wherein the functionalized layer is a hard coat layer and/or antireflection layer.

7. A heat ray shielding molded product according to claim 1, wherein in a hue of the plate-like portion, "L" value is 92 to 35, "a" value is 5 to −15 and "b" value is 15 to −5.

8. Window or window parts for usual buildings or vehicles comprising the heat ray shielding molded product as defined in claim 1.

* * * * *